United States Patent [19]
Hugie

[11] 3,771,631
[45] Nov. 13, 1973

[54] HYDRAULIC TRANSMISSION

[76] Inventor: John Hugie, Box 837, Tisdale, Saskatchewan, Canada

[22] Filed: Aug. 30, 1972

[21] Appl. No.: 285,074

[52] U.S. Cl. .............................. 192/58 R
[51] Int. Cl. ........................... F16d 31/06
[58] Field of Search .................. 192/58 R

[56] References Cited
UNITED STATES PATENTS

| 2,737,276 | 3/1956 | Wyndham | 192/58 R |
| 2,747,432 | 5/1956 | Miller | 192/58 R X |
| 2,907,429 | 10/1959 | Selden | 192/58 R |

FOREIGN PATENTS OR APPLICATIONS

| 810,082 | 12/1936 | France | 192/58 R |
| 496,111 | 4/1930 | Germany | 192/58 R |

Primary Examiner—Allan D. Hermann
Attorney—Stanley G. Ade

[57] ABSTRACT

An engine drives a cylindrical drum mounted for rotation around a hub which in turn is mounted for rotation in an outer casing which contains transmission fluid. A rotor is journalled for rotation off center in the hub and a plurality of gear lobes is secured at spaced intervals internally around the inner wall of the drum. The rotor is provided with corresponding cut out portions which engage the lobes as the hub rotates thus rotating the rotor to present the next cut out to the next lobe. Grooves are provided at the sides of the cut outs and the rotor is end shiftable either automatically by oil pressure or manually. Normally the transmission fluid bypasses between the lobes and the rotor due to the grooves but as the rotor is end shifted the grooves gradually close off so that drive is transmitted hydraulically from the drum through the lobes to the lobes thus rotating the hub which acts as the driven portion of the assembly.

11 Claims, 9 Drawing Figures

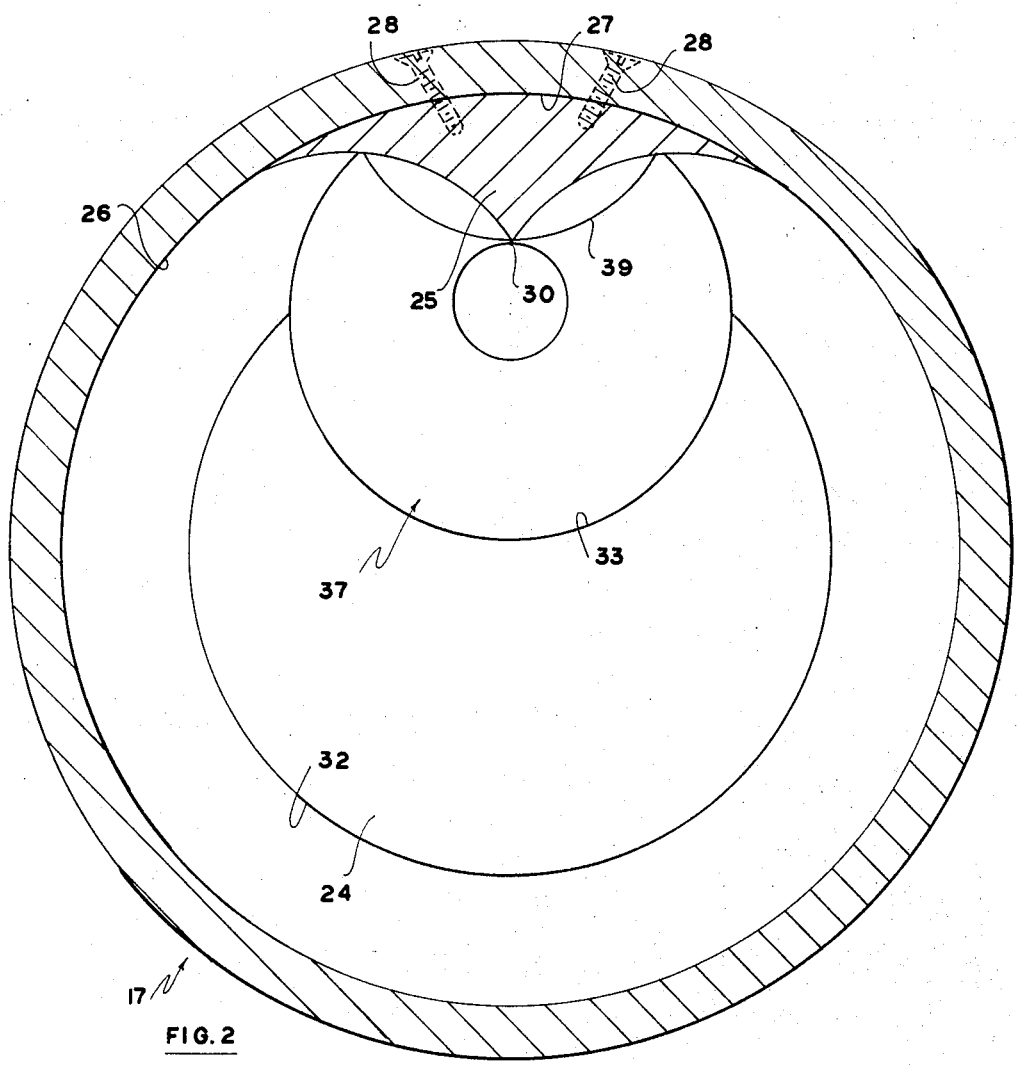
FIG. 2
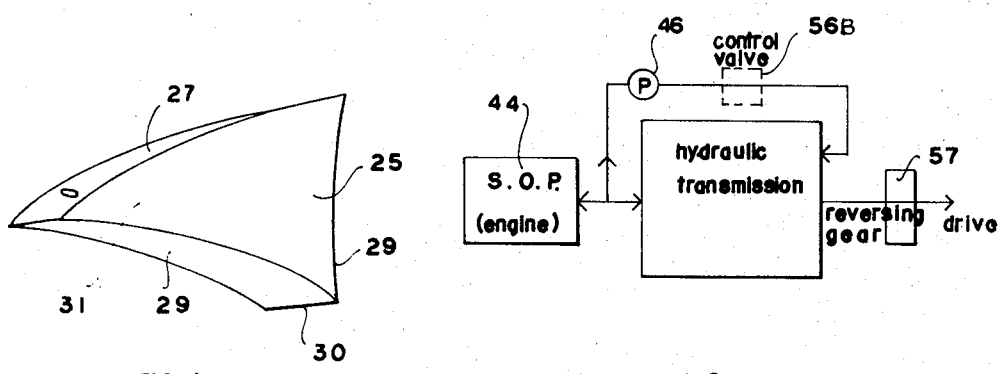
FIG 4
FIG. 9

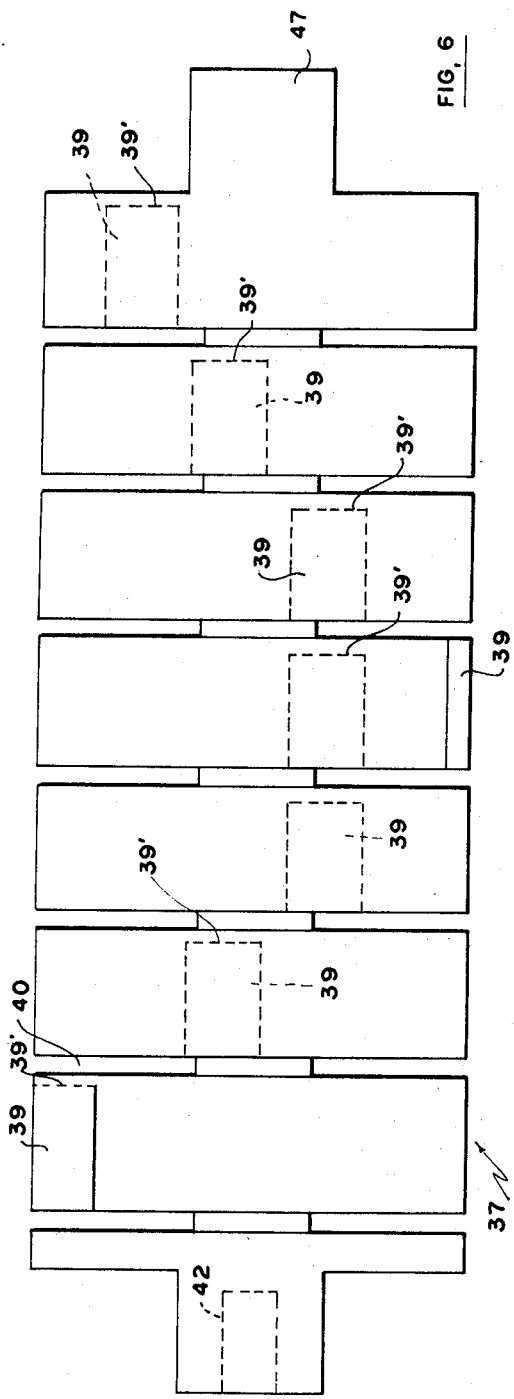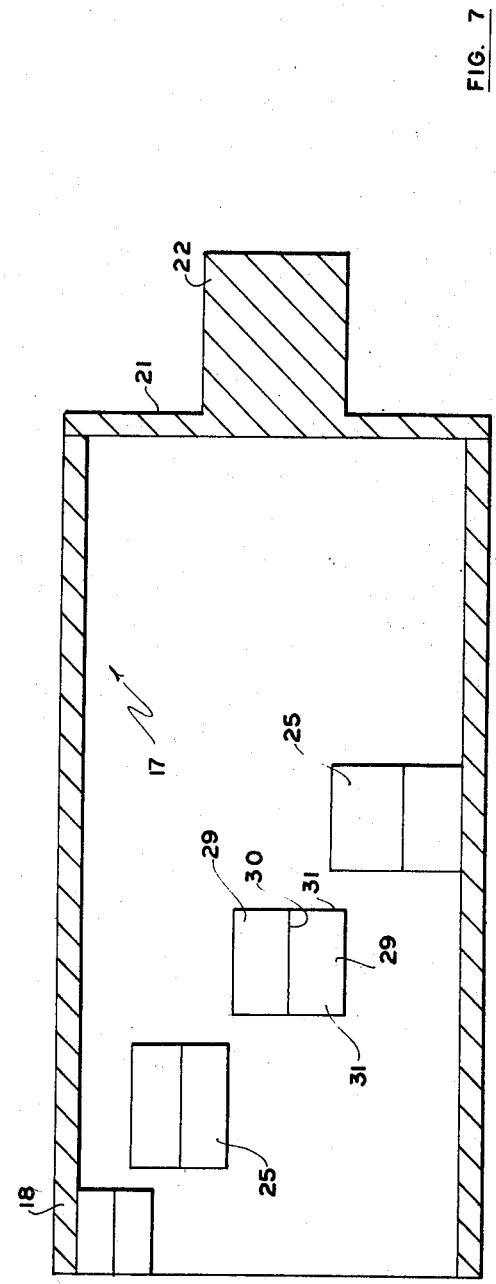

HYDRAULIC TRANSMISSION

BACKGROUND OF THE INVENTION:

This invention relates to new and useful improvements in hydraulic transmissions, particularly suitable for use with vehicles although of course the transmission can be used for other purposes as desired.

It is normal for conventional hydraulic transmissions to operate by means of hydraulic pump in accordance with an hydraulic motor. This type of unit utilizes extemely high pressures thus creating a heating problem which, under abnormal circumstances can lead to foaming of the transmission fluid. In any event of course any heat generated causes an energy loss between the drive and driven components.

SUMMARY OF THE INVENTION:

The present invention overcomes these disadvantages by providing a transmission unit that uses a high volume and low pressure system thus eliminating the heating problem and thereby reducing energy loss to a minimum. The necessity of a cooling device is eliminated.

The principal object and essence of the invention is therefore to provide a device of the character herewithin described in which a drive member is connectable to a driven member and operable from a neutral position to a full driving position either automatically or manually controlled as desired.

A further object is to provide a transmission unit that can readily be programmed to engine size, power curves or country and/or city service, etc., for maximum performance.

A yet further object of the invention is to provide a device of the character herewithin described which utilizes the minimum of moving parts inasmuch as there are three rotating components namely a hub, a drum surrounding the hub and a control rotor within the hub, all mounted on anti-friction bearings so that friction is reduced to a minimum.

Still another object of the invention in conjunction with the foregoing object is to provide a device of the character herewithin described which, because of the minimum number of moving parts available, is less prone to mechanical breakdown.

Still another object of the invention is to provide a transmission that requires no friction clutch or high oil pressure, the use of which leads to failure when operated under abnormal conditions.

Still another object of the invention is to provide a device of the character herewithin described which can be utilized with both variable and constant engine speeds or can be controlled automatically or manually.

A still further object of the invention is to provide a device of the character herewithin described which is simple in construction, economical in manufacture and otherwise well suited to the purpose for which it is designed.

With the foregoing objects in view, and such other or further purposes, advantages or novel features as may become apparent from consideration of this disclosure and specification, the present invention consists of the inventive concept which is comprised, embodied, embraced, or included in the means, method, process, product, construction, composition, arrangement of parts, or new use of any of the foregoing, herein exemplified in one or more specific embodiments of such concept, reference being had to the accompanying drawings in which:

BRIEF DESCRIPTION OF THE DRAWINGS:

FIG. 2 is an end sectional view showing the control rotor in one position.

FIG. 4 is an isometric view of one of the gear lobes per se.

FIG. 6 is a side elevation of the control rotor per se.

FIG. 7 is a sectional view of the drum per se.

FIG. 9 is a schematic block diagram showing the connection of the source of power to the hydraulic transmission.

In the drawings like characters of reference indicate corresponding parts in the different figures.

Figure 1:
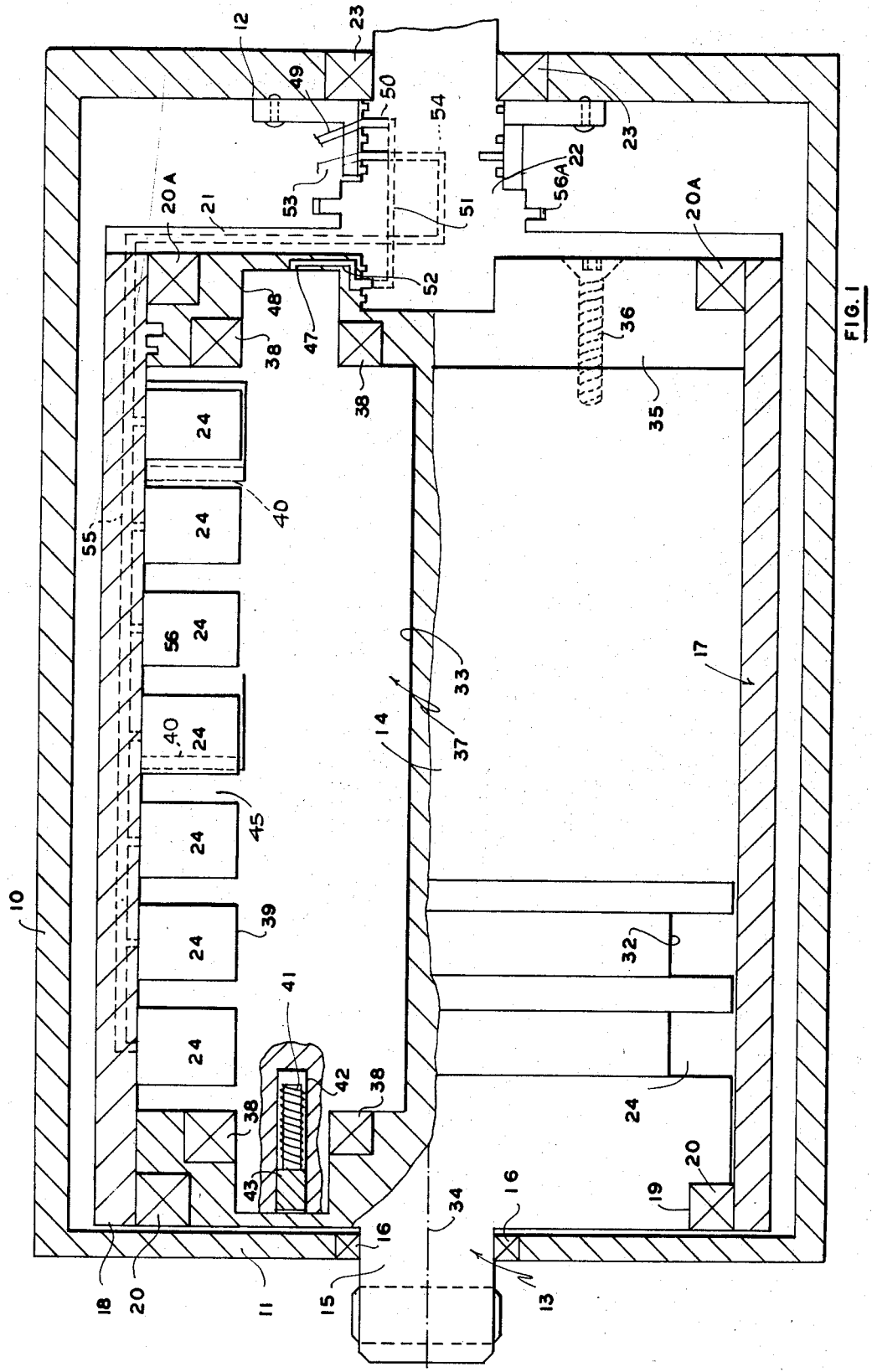
FIG. 1 is a side elevation of the transmission partially sectioned to show the interior thereof.
Figure 3:
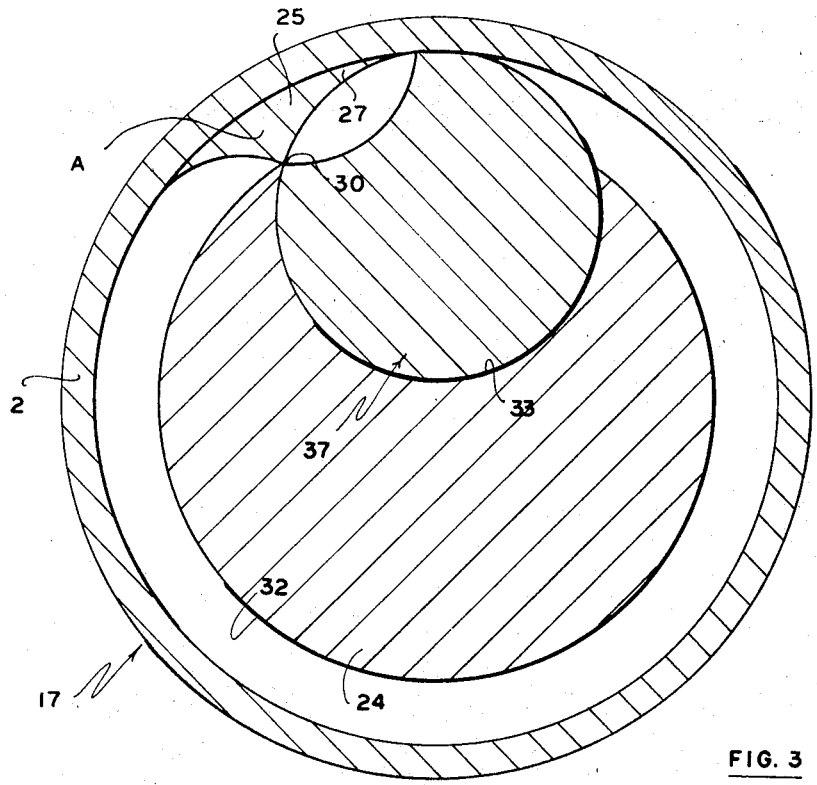
FIG. 3 is a view similar to FIG. 2 but showing the control rotor in the next succeeding position.
Figure 8:
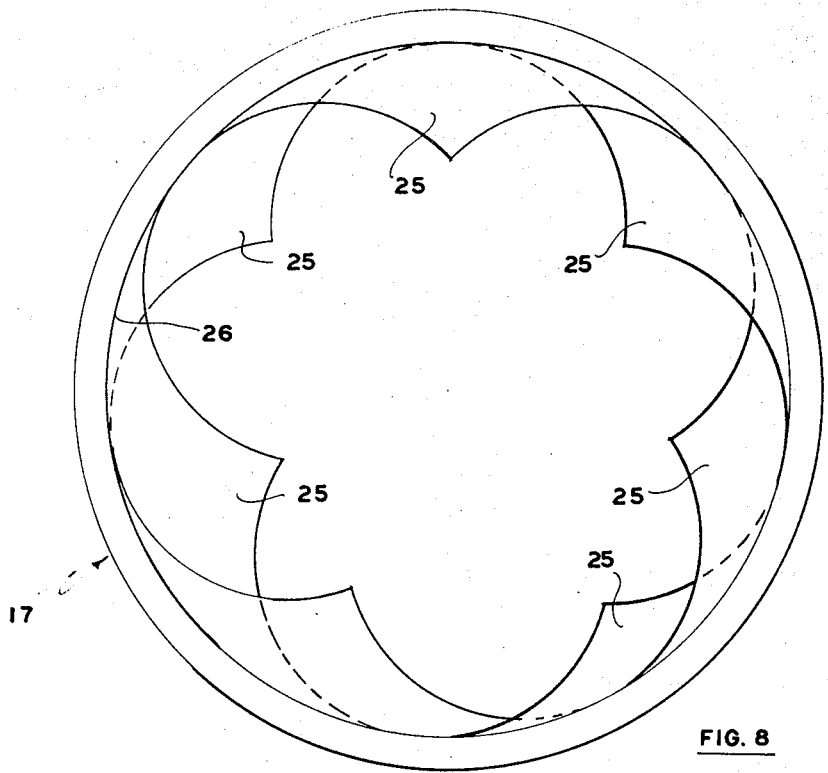
FIG. 8 is an end view of the drum per se.
Figure 5:
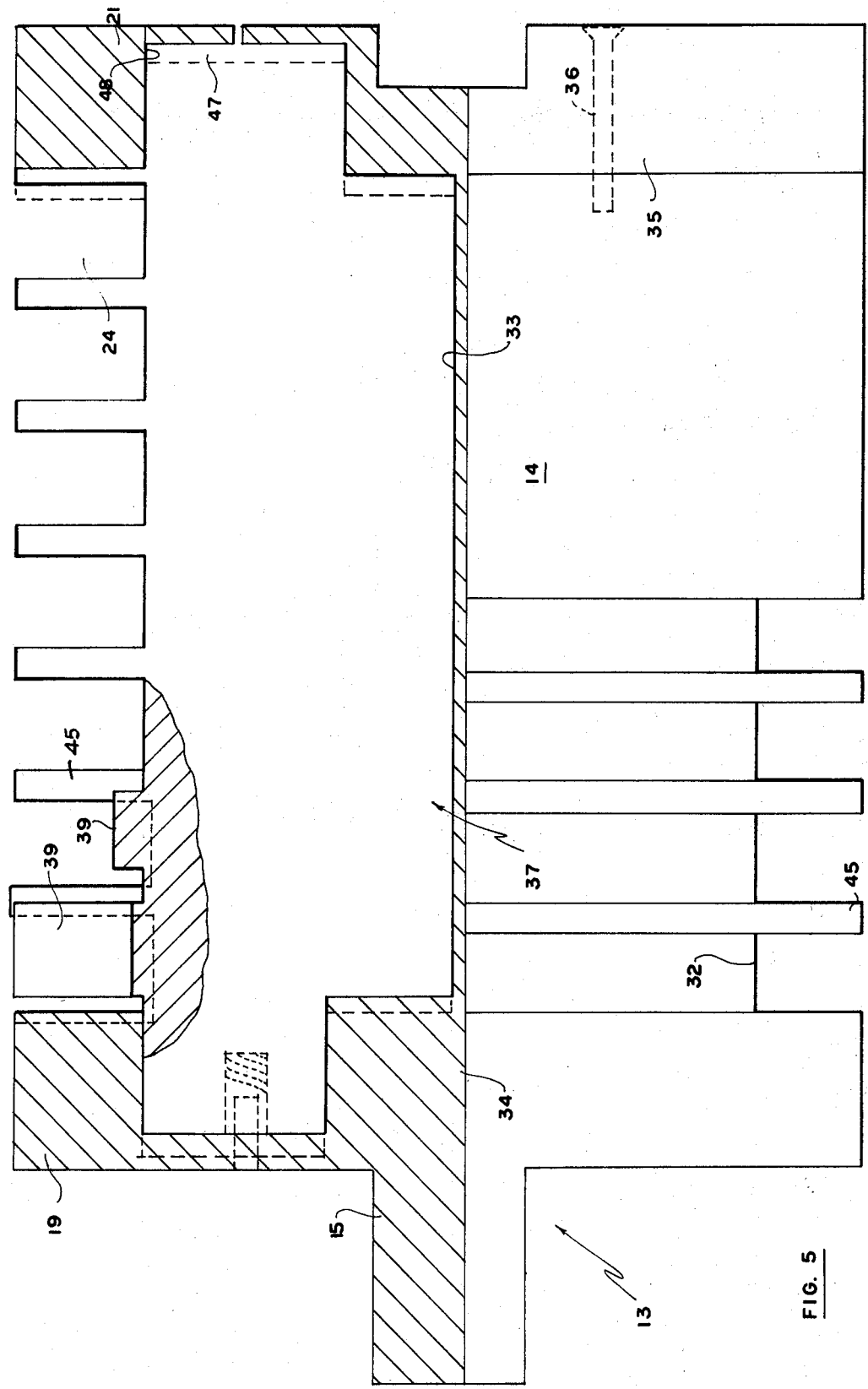
FIG. 5 is a side elevation of the hub and rotor partially sectioned.

DETAILED DESCRIPTION OF THE INVENTION:

Proceeding therefore to describe the invention in detail, reference character 10 illustrates a cylindrical casing having end plates 11 and 12 and adapted to contain hydraulic transmission fluid (not illustrated).

A hub component collectively designated 13 includes a cylindrical body 14 and a mounting shaft 15 which extends through a drilling in the end casing plate 11 and is supported for rotation therein through the medium of bearings 16.

A cylindrical drum collectively designated 17 coaxially engages over the hub 13 and one end 18 is supported by the end 19 of the drum through the agency of bearings 20 as clearly shown in FIG. 1.

The other end of the drum includes an end wall 21 and a shaft 22 which in turn is supported upon bearings 23 within the end wall 12 of the casing. Further bearings 20A are provided between the drum 18 and the drum well 17 of the hub as clearly shown so that the drum is co-axially mounted for independent rotation upon the hub and each is mounted for rotation within the end walls 11 and 12 of the casing.

In the present application, the drum acts as the driving component and the hub as the driven component but of course these positions can be reversed if desired.

A plurality of straight sided annular grooves 24 are formed in spaced apart relationship around the hub body 14 and a plurality of gear lobes 25 are secured to the inner wall 26 of the drum and engage within the grooves 24.

In the present embodiment, there are seven such grooves 24 and a corresponding gear lobe 25 for each of these grooves. However, it will be appreciated that any desired number of lobes and grooves can be provided although three is the practical minimum.

In the present embodiment, the gear lobes 25 are spaced around the wall of the drum and are separated radially by equal amounts, namely 51.4°. The lobes also are in staggered relationship one with the other so that a spiral effect is provided, each lobe being in a different vertical plane than the preceding lobe. In this design, lobes 25 serve a dual purpose. Firstly to displace oil in grooves 24 and secondly to provide a gear lobe to rotate rotor 37. However the rotor can be rotated by a gear train (not illustrated) instead.

FIG. 4 shows the shape of the lobes with the curved attaching surface 27 engaging the inner wall 26 of the drum, studs 28 being used to attach the lobes to the wall as shown in FIG. 2. The curved faces 29 of the lobes terminate in the apex 30, the purpose of which will hereinafter be described. However it will be appreciated that the side faces 31 of the lobes and the apex 30 are machined to be a running fit within the straight sided grooves 24 with the apex 30 being a clearance fit with the base 32 of the grooves.

A cylindrical bore 33 is formed through the hub body 14 parallel to but spaced from the longitudinal axis of the hub indicated by reference character 34 and this bore terminates spaced from one end 18 of the hub.

The other end of the bore is closed off by an end cap or plate 35 secured across the other end of the hub by means of set screws 36.

Within the bore 33 is situated a control rotor component collectively designated 37 and this rotor component is supported for rotation within the bore by means of bearing 38 adjacent either end thereof as clearly shown in FIG. 1.

The bore 33 is dimensioned and positioned so that it breaks out into the peripheral surface of the hub body 14 and the width of this break out is of course accentuated where it intersects the aforementioned grooves 24. The periphery of the control rotor 37 is coincident with the periphery of the outer wall of the hub body 14.

Arcuately curved cut out portions 39 are formed within the control rotor component one for each gear lobe 25 and these arcuately curved cut outs are dimensioned so that the apex 30 of the gear lobes sweep around the arcuate curved cut out 39 during rotation as will herinafter be described. The cut out portions are slightly wider than the grooves 24 and annular grooves 40 are formed on each side of the cut out portions within the wall of the rotor component 37 as clearly shown in FIG. 6.

However, these cut out portions 39 are not continuous but are separated by channel walls 39' to allow an equal pressure on the rotor wall. Furthermore, this construction allows the rotor to float freely thus preventing endwise pressure on the rotor due to changes in oil pressure.

The rotor component 37 is end shiftable within limits, with the bore 33 and is normally maintained or biassed in one direction (to the right with reference to FIG. 1) by means of a compression spring 41 engaged within a blind drilling 42 in one end of the control component and reacting between the base of this drilling and a plunger 43 in contact with end wall of the drum body 14.

When in this position, the grooves 40 in the control rotor are open to the grooves 24.

Rotation of the drum component 17 by means of the source of power 44 will cause the gear lobes 25 to enter the cut out portions 39 of the rotor 37 consecutively and rotate same with transmission fluid escaping through the annular grooves 40 so that no pressure build up occurs and the hub 13 remains stationary. In other words the transmission is in the neutral position.

However as the speed of the engine increases, means are provided operated either manually or automatically, to gradually end shift the rotor component 37 in the opposite direction against pressure of spring 41. As this occurs, the grooves 40 gradually become covered up by the shrouding of same by means of the portions 45 between adjacent grooves 24 within the hub body 14. This gradually increases the resistance or compression of the hydraulic transmission fluid between the individual gear lobes 25 and the cut away portion 39, the fluid being trapped through the majority length of the annular grooves 24. Thus rotation is imparted to the hub 13 to a greater degree until the grooves 40 are completely covered and the speed of rotation of the hub equals the speed of rotation of the drum.

It should be noted that the rotor cut away portion 39 are wider than the lobes 25 thus allowing for axial movement of the rotor. This also prevents lobes 25 from blocking this axial movement. When in the neutral position with the rotor to the right with reference to FIG. 1, grooves 40 are in alignment with channel openings 24 thus allowing oil to bypass the rotor 37 as illustrated in dotted lines in FIG. 1. However as rotor 37 is moved to the left or to the full drive position, with reference to FIG. 1, grooves 40 becomes covered by hub portion 45 as illustrated by broken lines in FIG. 1. The oil is now locked in channels 24 between lobes 25 and rotor 37 creating a one to one ratio between drum 17 and hub 13.

Means are provided to cause this end shifting of the rotor component automatically and may take the form of an oil pump 46 driven by the source of power in the form of engine 44.

Transmission fluid under pressure is routed from the pump to the spigot end 47 of the rotor component where it engages within a cylindrical bore 48 formed within the end plate 35.

This transmission oil is connected by a conduit 49 to a drilling 50 within the portion 22 and thence by a horizontal gallery 51 to a radially extending gallery 52 within the end cap 35 and thence to one end of the cylindrical bore 48.

The spigot end acts as a piston within the cylindrical bore 48 and the transmission fluid under pressure acts against the end of the spigot moving the control rotor endwise or to the left with reference to FIG. 1 against pressure of spring 41. As the speed of the engine increases, the transmission fluid pressure also increases so that the control rotor is moved fully to the left. As the speed of the motor decreases, the force of spring 41 gradually overcomes the oil or transmission fluid pressure and moves the control rotor to the right or to the neutral position with reference to FIG. 1.

It is necessary that the amount of the fluid within the drum remain constant and in this regard a further conduit 53 connects transmission fluid under pressure to the portion 22 of the end cap 35 and thence via horizontal gallery 54 to a transverse gallery 55 within the wall of the drum having outlets 56 adjacent each of the annular grooves 24. The transmission fluid is fed into these grooves for make up purposes on the low pressure side thereof.

Reference character 56A shows a gear or sprocket to which may be connected the drive gear of the oil pump.

FIG. 9 shows a block diagram of the arrangement in which the source of power takes the form of engine 44 which is directly coupled to portion 15 of the hub component 13 and in which oil pump 46 automatically causes the end shifting of the control rotor 37. However a control valve 56B may be utilized so that the pressure of the oil on the end of the control rotor 37 may be controlled manually.

Also reference character 57 indicates a conventional reverse gear which can be incorporated between the transmission and the drive to the vehicle wheels or the like. However as such construction is conventional it is not believed necessary to show further details thereof.

It will therefore be appreciated that a relatively large volume low pressure hydraulic transmission is provided which will generate very little heat thus causing very little loss of power. Furthermore the transmission can be either fully automatic or manual and can of course use both variable and constant engine speeds.

Various modifications may be constructed or performed within the scope of the inventive concept disclosed. Therefore what has been set forth is intended to illustrate such concept and is not for the purpose of limiting protection to any herein particularly described embodiment thereof.

What I claim as my invention is:

1. An hydraulic transmission connectable to a source of power comprising in combination an outer casing, a hub component journalled for rotation in one end of said casing and a drum component journalled for rotation in the other end of said casing, said hub component engaging within said drum and being bearably supported for rotation therein, one of said components acting as a drive member and the other of said components acting as a driven member, a rotor receiving bore formed longitudinally through said hub component parallel to but spaced from the longitudinal axis of said hub component, said bore breaking out onto the periphery of said hub component and a rotor component journalled for rotation within said bore, means to end shift said rotor component within limits, and within said bore, means movably biassing said rotor component to a neutral drive position, a plurality of gear lobes secured equidistantly around the inner wall of said drum in staggered array, corresponding gear lobe cut out portions formed in the wall of said rotor, annular grooves formed in said rotor on each side of each of said cut out portions, said grooves normally being open to the inner wall of said drum whereby transmission fluid bypasses said gear lobes and said cut outs, said grooves gradually closing off as said rotor is end shifted as aforesaid thereby increasing the hydraulic action between said gear lobes and said cut outs and increasing the relative speed of said driven member.

2. The transmission according to claim 1 in which said means normally biassing said rotor component to said neutral drive position comprises a spring reacting between one end of said hub and one end of said rotor component.

3. The transmission according to claim 2 in which said means to end shift said rotor component includes a source of oil under variable pressure reacting against the other end of said hub.

4. The transmission according to claim 3 in which said source of oil includes a variable oil pump operatively connected to said source of power whereby increase in speed of said source of power increases the pressure of oil delivered by said pump, thus end shifting said rotor against the pressure of said spring.

5. The transmission according to claim 3 in which said drum includes a mounting end comprising an axially located bearing hub, oil gallery means extending through the wall of said hub and through said mounting end, said other end of said rotor engaging within a cylindrical bore formed in said mounting end, said oil galley means being connected to said cylindrical bore.

6. The transmission according to claim 4 in which said drum includes a mounting end comprising an axially located bearing hub, oil galley means extending through the wall of said hub and through said mounting end, said other end of said rotor engaging within a cylindrical bore formed in said mounting end, said oil galley means being connected to said cylindrical bore.

7. An hydraulic transmission connectable to a source of power comprising in combination a cylindrical casing holding transmission fluid, a hub component and a drum component, one of said components acting as a drive member, and the other of said components acting as a driven member, said hub component being bearably supported for rotation with said drum component in co-axial relationship, said hub component and said drum component being bearably supported for rotation within said casing, means cooperating between said hub component and said drum component to connect one component drivably to the other component and at infinitely variable speeds between a neutral position and a full drive position, said last means including a control rotor component journalled for rotation within said hub component and extending longitudinally thereof and being spaced from but parallel to the longitudinal axis of said hub component, a bore in said hub component to receive and support said control rotor component for rotation and breaking out onto the surface of said hub component, gear lobe means on the inner wall of said drum component, annular gear lobe grooves around said hub engageable by said gear lobe means, and cut out portions formed in said rotor engageable successively with said gear lobe means as said hub rotates, said control rotor components being end shiftable within limits, within said hub, means to end shift said control rotor component as aforesaid, and means to bypass transmission fluid as said hub rotates when said transmission is in a neutral position, said last means gradually closing as said transmission operates from a neutral position towards the full drive position.

8. The transmission according to claim 7 in which said means normally biassing said rotor component to said neutral drive position comprises a spring reacting between one end of said hub and one end of said rotor component.

9. The tramsmission according to claim 8 in which said means to end shift said rotor component includes a source of oil under variable pressure reacting against the other end of said hub.

10. The transmission according to claim 8 in which said source of oil includes a variable oil pump operatively connected to said source of power whereby increase in speed of said source of power increases the pressure of oil delivered by said pump, thus end shifting said rotor against the pressure of said spring.

11. The transmission according to claim 7 in which said control rotor component includes an annular groove formed around said rotor on said side of said cut out portions and communicating therewith, said grooves being open to said annular grooves formed around said hub when in the neutral position whereby transmission oil is bypassed as said hub rotates, said grooves in said control rotor gradually being closed off as said rotor component is end shifted thereby increasing resistance to bypassing of transmission fluid and increasing the speed of said drum up to a speed equal to said hub when said grooves are fully closed.

* * * * *